United States Patent [19]

Saitoh et al.

[11] 3,992,508

[45] Nov. 16, 1976

[54] METHOD OF REMOVING NITROGEN OXIDES FROM A GAS CONTAINING NITROGEN OXIDES

[75] Inventors: Shigeru Saitoh; Tetsuya Watanabe; Koji Konno; Tadashi Nakamura, all of Iwaki, Japan

[73] Assignee: Kureha Kagaku Kogyo Kabushiki Kaisha, Tokyo, Japan

[22] Filed: Jan. 21, 1975

[21] Appl. No.: 542,778

[30] Foreign Application Priority Data

| Jan. 21, 1974 | Japan | 49-9158 |
| May 10, 1974 | Japan | 49-51934 |
| Dec. 4, 1974 | Japan | 49-138967 |

[52] U.S. Cl. .............................. 423/235; 423/351
[51] Int. Cl.$^2$ ........................................ C01B 21/00
[58] Field of Search .......... 423/235, 351, 367, 243, 423/239, 242; 55/68

[56] References Cited

UNITED STATES PATENTS

| 1,609,872 | 12/1926 | Garner et al. | 423/235 |
| 2,031,802 | 2/1936 | Tyler | 423/242 |
| 2,132,482 | 10/1938 | Johnstone | 423/242 |
| 2,142,987 | 1/1939 | Bacon et al. | 423/242 |
| 2,865,707 | 12/1958 | Hogsed | 423/367 |
| 3,044,844 | 7/1962 | Maury et al. | 423/235 |
| 3,565,813 | 2/1971 | Bersworth | 423/235 |
| 3,635,657 | 1/1972 | Bressan et al. | 423/235 |
| 3,757,488 | 10/1973 | Austin et al. | 423/235 |

FOREIGN PATENTS OR APPLICATIONS

| 1,454,723 | 10/1966 | France | 423/235 |
| 1,302,767 | 10/1961 | France | 423/235 |
| 1,251,900 | 10/1967 | Germany | 423/236 |

OTHER PUBLICATIONS

Chem. Abstr. –vol. 70–1969–No. 73674c.
Chem. Abstr. –vol. 63–1965–No. 14350d.

*Primary Examiner*—Oscar R. Vertiz
*Assistant Examiner*—Eugene T. Wheelock
*Attorney, Agent, or Firm*—Lane, Aitken, Dunner & Ziems

[57] ABSTRACT

A method of effectively removing nitrogen oxides which are entrained in a gas, wherein a nitrogen oxide-containing gas is brought into contact with an aqueous solution which contains at least one ferrous salt and one sulfurous acid alkali salt to absorb the nitrogen oxides in the solution in the form of imidodisulfonic acid alkali salt, hydrolyzing the imidodisulfonic acid alkali salt to obtain a hydrolyzate-containing solution, and adding nitrous acid, nitrous acid anhydride, or nitrite to the hydrolyzate-containing solution to generate nitrogen.

11 Claims, No Drawings

METHOD OF REMOVING NITROGEN OXIDES FROM A GAS CONTAINING NITROGEN OXIDES

FIELD OF THE INVENTION

This invention relates to a method of efficiently removing nitrogen oxides from a gas mixture, and more particularly to a method of efficiently removing nitrogen oxides from the gas mixture and converting same to harmless nitrogen.

BACKGROUND OF THE INVENTION:

Examples of gases containing oxides of nitrogen (hereinafter referred to as $NO_x$) are exhaust gases from combustion apparatuses such as boilers, nitric acid manufacturing plants, various metal treating processes and other nitrogen oxide generating plants.

In recent years, concern has grown over the so-called photochemical smog. One of the main causes of such photochemical smog is a large quantity of $NO_x$ present in the atmosphere. It is therefore desirable to reduce the quantity of $NO_x$ contained in such exhaust gases and/or to remove $NO_x$ from such exhaust gases.

In combustion apparatuses such as boilers, for example, the $NO_x$ content in the exhaust gas has been reduced conventionally by employment of burners and furnaces of improved design. These methods, however, are not very effective because they allow the reduction of $NO_x$ only within narrow limits both for theoretical and economical reasons.

It is also well known in the art to employ the so-called wet type processes for the removal of $NO_x$ from an exhaust gas, using an alkaline aqueous solution containing sodium hydroxide or sodium sulfite; an aqueous solution of potassium permanganate; an aqueous solution of hypochlorite or chlorite; or an aqueous solution of ferrous salt and sulfurous acid alkali salt (alkali sulfite). The present inventors disclosed in their copending application Ser. No. 517,370, filed Oct. 23, 1974, as a new wet type process, a method for removing nitrogen oxides from a gas containing nitrogen oxides, which is characterized by bringing the nitrogen oxides-containing gas into contact with an aqueous solution containing an organic acid alkali salt and a salt of metal selected from the group consisting of Fe, Co, Ni, Cu and Mn in the presence of a sulfurous acid alkali salt. In the abovementioned wet type processes, no method for effectively treating an absorption solution containing absorbed $NO_x$ has been devised. Accordingly, there is a strong demand for a method which is more efficient in removing $NO_x$ from a gas mixture by effectively treating the absorption solution.

SUMMARY OF THE INVENTION

An object of the present invention, therefore, is to provide a method of removing $NO_x$ from a gas containing $NO_x$ and converting same to harmless nitrogen, by effectively treating the absorption solution of the wet type process.

This and other objects of the present invention will become apparent from the following description. It has now been discovered that $NO_x$ gases are absorbed in a solution containing a ferrous salt and a sulfurous acid alkali salt in the form of imidodisulfonic acid alkali salts. The present inventors have further discovered that nitrogen can be generated by adding nitrous acid, nitrous acid anhydride, or nitrate to the solution which is obtained by hydrolyzing the imidodisulfonic acid alkali salt.

In the present invention a nitrogen oxides-containing gas is contacted with an aqueous solution which contains at least one ferrous salt and a sulfurous acid alkali salt, to absorb the $NO_x$ in the aqueous solution in the form of imidodisulfonic acid alkali salt, the thus produced imidodisulfonic acid alkali salt is hydrolyzed to obtain a hydrolyzate-containing solution, and nitrous acid, nitrous acid anhydride, or nitrate is added to the hydrolyzate-containing solution to generate nitrogen.

DETAILED DESCRIPTION OF THE INVENTION

The aqueous solution referred to herein as containing at least one ferrous salt and a sulfurous acid alkali salt may be, for example, (1) an aqueous solution containing a ferrous salt and a sulfurous acid alkali salt, (2) an aqueous solution which contains a ferrous salt, an organic acid alkali salt and a sulfurous acid alkali salt, (3) an aqueous solution which contains a ferrous salt, an organic acid alkali salt, an organic acid and sulfurous acid alkali salt, (4) an aqueous solution which contains a ferrous salt of an organic acid and a sulfurous acid alkali salt, or (5) an aqueous solution which contains a ferrous salt of an organic acid, an organic acid alkali salt, an organic acid and a sulfurous acid alkali salt. Examples of the suitable ferrous salts include inorganic salts such as ferrous sulfate, ferrous nitrate and ferrous chloride, and various water-soluble ferrous salts of organic acids such as acetic acid, propionic acid, butyric acid, malonic acid, succinic acid, ethylenediamine tetracarboxylic acid nitrilo-tricarboxylic acid and mixtures thereof. When an iron salt of ethylenediamine tetracarboxylic acid or nitrilo-tricarboxylic acid is used, the iron salt need not be in the form of ferrous salt but may also be used in the form of a ferric salt. The ferric salt is easily reduced to the ferrous salt by the coexisting sulfurous acid alkali salt, forming an aqueus solution which contains substantially a ferrous salt. The organic acid alkali salts used are water-soluble salts of organic acids, for example: salts of organic acids with alkali metals such as Li, Na and K; salts of organic acids with alkali earth metals such as Mg and Ca; and ammonium salts of organic acids. The organic acids forming these organic acid alkali salts include, for example: monobasic acid such as acetic acid, propionic acid and butyric acid; dibasic acids such as malonic acid and succinic acid; polybasic acids such as ethylenediamine tetracarboxylic acid and nitrilo-tricarboxylic acid. A typical example of an ethylenediamine tetracarboxylic acid is ethylenediamine tetraacetic acid (hereinafter referred to as EDTA) and a typical example of a nitrilotricarboxylic acid is nitrilo-triacetic acid (hereinafter referred to as NTA). The carboxylic acids forming ethylenediamine tetracarboxylic acids and nitrilo-tricarboxylic acids may be, for example, propionic acid, butyric acid or both of these acids.

It should be understood, however, that the carboxylic acids are not limited only to these acids and that other suitable acids may also be employed. The sulfurous acid alkali salts are used in the form of $M_2SO_3$ or $MHSO_3$ (wherein, M represents an alkali as in the organic acid alkali salt) and include for example, sodium sulfite, potassium sulfite, ammonium sulfite, sodium bisulfute, potassium bisulfite or ammonium bisulfite, etc. and mixtures thereof.

It is assumed that, when an $NO_x$-containing gas is contacted with an aqueous solution which contains at least one ferrous salt and one sulfurous acid alkali salt as previously mentioned, the $NO_x$ and the ferrous salt form a complex in the aqueous solution and the complex thus produced forms an imidodisulfonic acid alkali salt by reaction with the sulfurous acid alkali salt, according to the following reaction formulae (1) and (2) (where the ferrous salt is represented by ferrous sulfate, $NO_x$ is represented by NO, and the sulfurous acid alkali salt is represented by sodium sulfite, respectively).

$$FeSO_4 + NO \rightarrow Fe(NO)SO_4 \qquad 1.$$

$$Fe(NO)SO_4 + 2Na_2SO_3 + 2H_2O \rightarrow Fe(OH)_3 + Na_2SO_4 + NH(SO_3Na)_2 \qquad 2.$$

It will be clear from the foregoing reaction formulae (1) and (2) that the absorption of $NO_x$ becomes difficult with an insufficient amount of ferrous salt and that it becomes difficult to satisfactorily produce the imidodisulfonic acid alkali salt with an insufficient amount of sulfurous acid alkali salt. Therefore, the aqueous solution should contain the ferrous salt and sulfurous acid alkali salt in adequate amounts. In the present invention, the aqueous solution should contain the ferrous salt in an amount, in terms of moles, equal to or greater than the amount of $NO_x$ to be absorbed, preferably in an amount at least 0.02% by weight. Moreover, the aqueous solution to be employed in the present invention should contain the sulfurous acid alkali salt in an amount, in terms of moles, two times greater than that of the ferrous salt, preferably in an amount at least 0.2% by weight. With larger amounts of sulfurous acid alkali salt in the aqueous solution, larger amounts of imidodisulfonic acid alkali salt are produced. When the content of the sulfurous acid alkali salt in the aqueous solution is equal to or greater than 1% by weight, approximately 90% of the $NO_x$ which has been absorbed in the solution is converted into imidodisulfonic acid alkali salt. In this manner, when the imidodisulfonic acid alkali acid is produced, a portion of the $NO_x$ which is absorbed in the aqueous solution forms a nitrilotrisulfonic acid alkali salt $(N(SO_3M)_3)$ and a sulfamic acid alkali salt $(NH_2SO_3M)$. The thus formed nitrilo-trisulfonic acid alkali salt is converted easily into sulfamic acid or its alkali salt by hydrolysis the imidodisulfonic acid alkali salt is hydrolyzed as will be discussed. Therefore, the production of such nitrilo-trisulfonic acid alkali salt and the sulfamic acid alkali salt do not impose adverse effects in the present invention.

It usually takes a relatively long time for the $NO_x$ in the gas to produce imidodisulfonic acid alkali salt after absorption in the aqueous solution. For example, where the $NO_x$ is absorbed in the aquous solution at 55° C and the solution, is then left standing at that temperature, it usually takes 3 to 4 hours before a major portion of the absorbed $NO_x$ is converted into imidodisulfonic acid alkali salt. The reaction time is reduced at higher temperatures, for example, at 90° C, 90% of the absorbed $NO_x$ is converted into imidodisulfonic acid alkali salt in 30 minutes. Thus, it is desirable to heat the absorption solution for the purpose of shortening the reaction time.

When the imidodisulfonic acid alkali salt is produced, precipitation of a ferric salt $(Fe(OH)_3)$ takes place in the absorption solution as shown by reaction formula (2) above. It is therefore necessary to remove the ferric salt by filtration from the absorption solution. However, this is not necessary when a polybasic acid such as EDTA or NTA is contained in the aqueous scrubbing solution, since the ferric salt forms a complex with the polybasic acid and is easily reduced by the sulfurous acid alkali salt coexisting in the absorption or scrubbing solution. When the gas under treatment contains sulfur oxides along with $NO_x$, the sulfur oxides are also absorbed in the absorption solution simultaneously with the $NO_x$.

The imidodisulfonic acid alkali salt thus formed in the absorption solution, is hydrolyzed into sulfamic acid or its alkali salt, as shown by the following reaction formulae (3) and (3)'.

$$NH(SO_3M)_3 + H_2O \rightarrow NH_2SO_3M + MHSO_3 \qquad 3.$$
$$NH(SO_3M)_2 + H_2O \rightarrow NH_2SO_3H + M_2SO_4 \qquad 3'.$$

(where M represents an alkali as previously mentioned). In this connection, whether the thus produced sulfamic acid exists in the form of a free acid or in the form of its alkali salt depends upon the pH of the solution subjected to hydrolysis.

In order to hydrolyze the imidodisulfonic acid alkali salt as shown in the reaction formulae (3) and (3)' given above, the pH value of the liquid subjected to hydrolysis should be below 6.5. Preferably, the hydrolysis should be carried out at a pH value below 5 and at a temperature of 40° to 100° C to ensure a sufficiently high rate of hydrolysis.

The sulfamic acid and the sulfamic acid alkali salt which are formed by hydrolysis in the present invention can be converted into nitrogen by adding to the hydrolyzate-containing solution a nitrogen compound selected form the group consisting of nitrous acid, nitrous acid anhydride or nitrite, for example, as shown by the following reaction formulae (4) and (5).

$$NH_2SO_3H + HNO_2 \rightarrow N_2 + H_2O + H_2SO_4 \qquad 4.$$

$$NH_2SO_3M + \tfrac{1}{2}Ca(NO_2)_2 \rightarrow N_2 + \tfrac{1}{2}CaSO_4 + \tfrac{1}{2}M_2SO_4 \qquad 5.$$

(where calcium nitrite is used as the nitrate and M represents an alkali as previously mentioned). Thus, it becomes possible to remove $NO_x$ from a gas containing $NO_x$ and to convert it to harmless nitrogen.

Examples of the nitrites which may be added to the hydrolyzate-containing solution include nitrous acid alkali salts such as ammonium nitrite, sodium nitrite, potassium nitrite, magnesium nitrate, calcium nitrite and the like. The reactions of formulae (4) and (5) may be carried out at room temperature when the pH of the solution is below 6. However, it is desirable to effect the reaction under acidic conditions at an elevated temperature to accelerate the reaction. The nitrogen so produced may be released as is, while the liquid which remains after release of nitrogen may be utilized again as a scrubbing solution for the absorption of $NO_x$. When a nitrous acid alkali salt is added to the hydrolyzate-containing solution, alkali ions are accumulated in the solution and recirculated after release of nitrogen. To avoid such an accumulation of alkali ions, it is desirable to employ, as the nitrous acid alkali salt, calcium nitrite which produces calcium sulfate $(CaSO_4)$ (which is only sparingly soluble) as shown by the reaction formula (5). In other words, where calcium nitrate is used, the accumulation of alkali ions can be suitably prevented by the filtration and separation of the calcium sulfate $(CaSO_4)$. On the other hand, where nitrous acid or nitrous acid anhydride is added to the hydrolyzate-containing solution, the solution after release of nitrogen becomes acidic due to the formation of sulfuric acid, as shown by the formula (4), and may be used for the hydrolysis of imidodisulfonic acid alkali salt as previously discussed.

It will be appreciated from the foregoing description that, according to the present invention, the $NO_x$ which is contained in a gas is removed therefrom and finally released after conversion to harmless nitrogen. Therefore, the present invention is particularly applicable to the treatment of $NO_x$-containing exhaust gases.

The invention will be illustrated more particularly by the following examples, which are given only by way of example and therefore should not be construed as limitative of the present invention.

EXAMPLE 1

| | |
|---|---|
| $FeSO_4$ | 2.0% by weight |
| $Na_2SO_3$ | 3.2% by weight |
| $CH_3COONa$ | 10.0% by weight |
| $CH_3COOH$ | 2.4% by weight |
| $H_2O$ | 82.4% by weight |

300 ml of NO gas was contacted at room temperature with 100 ml of an aqueous solution having the above composition, absorbing thereing 290 ml of the NO gas.

The liquid containing absorbed NO was heated to 95° C and maintained at that temperature for 30 minutes. As a result, a precipitate of an iron compound appeared in the liquid.

In order to confirm the formation of $NH(SO_3Na)_2$ which was dissolved in the liquid obtained by separating the resultant precipitate, 10 g of KCl was added thereto, followed by cooling to room temperature, to obtain 4.5 g of a second precipitate.

An infrared absorption spectrum analysis revealed that the second precipitate formed in the liquid contained $NH(SO_3K)_2$. It was found by an analysis that the nitrogen content in the precipitate corresponded to 70% of the absorbed NO gas. A further infrared quantitative analysis revealed that the precipitate contained 47% by weight of $NH(SO_3K)_2$.

Thereafter, the filtrate which was obtained after the filtration of the precipitate from the liquid was heated and condensed to precipitate a mixture of $N(SO_3K)_3$ and $NH_2(SO_3K)$ which were found, as a result of a quantitative analysis, to have a total nitrogen content corresponding to about 20% of absorbed NO. As a result, it was confirmed that about 90% of used NO gas was converted to the imidodissulfonic acid alkali salt.

EXAMPLE 2

| | |
|---|---|
| $FeSO_4$ | 2.0% by weight |
| $KHSO_3$ | 3.0% by weight |
| $CH_3COOK$ | 5.0% by weight |
| $CH_3COOH$ | 1.0% by weight |
| $H_2O$ | 89 % by weight |

300 ml of NO gas was contacted at 55° C with 100 ml of an aqueous solution having the above composition absorbing therein 280 ml of the NO gas. The liquid containing the absorbed gas was left standing at that temperature for 180 minutes. As a result, a precipitate of an iron compound appeared in the liquid. 10 g of KCl was added to the separated supernatant liquid, followed by cooling, to obtain a second precipitate.

As a result of an infrared absorption spectrum analysis, it was revealed that the second precipitate formed in the supernatent liquid contained $NH(SO_3)_2$. The precipitate had a nitrogen content corresponding to about 70% of the absorbed NO gas.

EXAMPLE 3

| | |
|---|---|
| $FeSO_4$ | 2.0% by weight |
| $Na_2SO_3$ | 5.0% by weight |
| $CH_3COONa$ | 5.0% by weight |
| $CH_3COOH$ | 3.0% by weight |
| $H_2O$ | 85.0% by weight |

300 ml of NO gas was contacted at 60° C with 100 ml of an aqueous solution having the above composition absorbing therein 290 ml of the NO gas. The liquid containing the absorbed gas was left standing at 60° C for 180 minutes. As a result, a precipitate of an iron compound appeared in the liquid. The iron compound was separated and 25 g of KCl was added to the supernatant liquid, followed by cooling, to obtain a second precipitate.

As a result of an infrared absorption spectrum analysis, it was revealed that the second precipitate from the supernatant liquid contained $NH(SO_3K)_2$ which had a nitrogen content corresponding to about 90% of the absorbed NO gas.

EXAMPLE 4

| | |
|---|---|
| $FeSO_4$ | 2.0% by weight |
| $CH_3COONa$ | 10.0% by weight |
| $CH_3COOH$ | 2.4% by weight |
| $Na_2SO_3$ | 2.0% by weight |
| $H_2O$ | 83.6% by weight |

300 ml of NO gas was contacted at room temperature with 200 ml of an aqueous solution having the above composition absorbing therein 295 ml of the NO gas. Sulfuric acid was added to the liquid containing the absorbed gas to adjust pH value to 2.0 and the liquid was heated at 80° C for 4 hours. Thereafter, 1.0 g of sodium nitrite of about 97% purity was added to the liquid to generate 292 ml of nitrogen gas, which corresponded to 99% of the absorbed NO gas.

EXAMPLE 5

| | |
|---|---|
| $FeSO_4$ | 2.0% by weight |
| $CH_3COONa$ | 10.0% by weight |
| $CH_3COOH$ | 2.4% by weight |
| $Na_2SO_3$ | 2.0% by weight |
| EDTA | 4.0% by weight |
| $H_2O$ | 79.6% by weight |

300 ml of NO gas was contacted at room temperature with 200 ml of an aqueous solution having the above composition absorbing therein 280 ml of the NO gas. The liquid containing the absorbed gas was treated in the same manner as in Example 4 to generate 276 ml of nitrogen gas, which corresponded to 98.5% of the absorbed NO gas.

EXAMPLE 6

| | |
|---|---|
| $FeSO_4$ | 2.0% by weight |

| | |
|---|---|
| Na$_2$SO$_3$ | 1.5% by weight |
| NaHSO$_3$ | 1.5% by weight |
| H$_2$O | 95.0% by weight |

300 ml of NO gas was contacted at room temperature with 100 ml of an aqueous solution having the above composition absorbing therein 260 ml of the NO gas. The liquid containing the absorbed gas was heated to produce a precipitate. After filtering the precipitate, sulfuric acid was added to the filtrate to adjust the pH value of 2.0, followed by heating at 80° C for 4 hours. Thereafter, 1.0 g of 97% pure sodium nitrite was added to the filtrate to generate 253 ml of nitrogen gas, which corresponded to 97.5% of the absorbed NO gas.

EXAMPLE 7

| | |
|---|---|
| FeSO$_4$ | 2.0% by weight |
| CH$_3$COONa | 10.0% by weight |
| CH$_3$COOH | 2.4% by weight |
| Na$_2$SO$_3$ | 2.0% by weight |
| EDTA-Na | 4.0% by weight |
| (ethylenediamine sodium tetraacetate) | |
| H$_2$O | 79.6% by weight |

200 ml of an aqueous solution having the above composition was introduced in a gas scrubbing bottle having an inner diameter of about 5 cm and equipped with a glass filter, and a nitrogen gas containing 300 ppm of NO was passed through the bottle at a rate of 100 l/h. The NO removal rate after a lapse of 10 hours was 82%, with 265 ml of NO absorbed in total. The liquid containing the absorbed gas was treated in the same manner as in Example 4 to generate 264 ml of nitrogen gas, which corresponded to about the entire amount of the absorbed NO.

EXAMPLE 8

| | |
|---|---|
| FeSO$_4$ | 3.0% by weight |
| CH$_3$COONa | 10.0% by weight |
| CH$_3$COOH | 4.5% by weight |
| Na$_2$SO$_3$ | 5.0% by weight |
| H$_2$O | 77.5% by weight |

850 ml of NO gas was absorbed at 50° C in 200 ml of an aqueous solution having the above composition. The liquid containing the absorbed gas was heated at 80° C for 1 hour to obtain a precipitate of ferrous hydroxide. After separating the precipitate by filtration, 18.0 g of potassium sulfate was added to and dissolved in the filtrate, followed by cooling to 30° C, to obtain crystals which mainly consisted of NH(SO$_3$K)$_2$ and K$_2$SO$_4$ and contained a small amount of sodium acetate. A quantitative analysis by the infrared spectrum absorption method revealed that the crystals contained 4.3 g of NH(SO$_3$K)$_2$. Part of the filtrate which was obtained after the filtration of the crystals was treated to adjust its pH value to 2.0 and then heated for 4 hours. From the quantity of nitrogen gas which was generated therefrom by reaction with sodium nitrite, it was calculated that the filtrate contained 3.6 g of residual NH(SO$_3$K)$_2$. This brought the total quantity of NH(SO$_3$K)$_2$ to 7.9 g which corresponded to 97 % of the absorbed NO gas.

The afore-mentioned crystals were washed with a small amount of cold water to obtain 4.1 g of NH(SO$_3$K)$_2$ and 0.7 g of K$_2$SO$_4$ in crystalline form. The crystals were suspended in 20 ml of water and concentrated sulfuric acid was added to the suspension to adjust its pH to 2.0. After heating the suspension for 4 hours, 1.25 g of calcium nitrite of 91% purity was added thereto for reaction at 60° C for 1 hours. As a result, 432 ml of nitrogen gas was generated, which corresponded to 97.5% of the NH(SO$_3$K)$_2$ which participated in the reaction. By an inverse calculation, it was confirmed that 94.6% of the absorbed NO gas was converted into nitrogen gas.

After separating by filtration by the by-product of calcium sulfate, the filtrate was cooled to 20° C to obtain crystals containing 1.6 g of K$_2$SO$_4$. The K$_2$SO$_4$ was filtered out and barium chloride was added to the filtrate. By a calculation based on the quantity of barius sulfate which was formed in the filtrate, it was revealed that $1.9 \times 10^{-2}$ mol of sulfate ions remained in the filtrate.

EXAMPLE 9

Crystals of 4.2 g of NH(SO$_3$K)$_2$ and 0.9 g of K$_2$SO$_4$ as obtained in Example 8 were suspended in 20 ml of water. After heating the suspension for 6 hours, it was brought into violent contact with a gaseous mixture of 230 ml of nitrogen monoxide and 230 ml of nitrogen dioxide at 60° C. The gas generated in the course of reaction contained 425 ml of nitrogen, which corresponded to 93.7 % of the NH(SO$_3$K)$_2$. By an inverse calculation, it was determined that 90.8% of the absorbed nitrogen oxides was converted into nitrogen gas. Upon cooling the resultant liquid to 20° C, there were obtained crystals containing 1.7 g of K$_2$SO$_4$. After filtering out the crystals, the filtrate was treated in the same manner as in Example 8 and was determined to contain $2.8 + 10^{-2}$ mol of sulfate ions.

EXAMPLE 10

| | |
|---|---|
| FeSO$_4$ | 2.0% by weight |
| Na$_2$SO$_3$ | 2.0% by weight |
| CH$_3$COONa | 10.0% by weight |
| CH$_3$COOH | 2.4% by weight |
| EDTA-Na | 2.0% by weight |
| (ethylenediamine sodium tetraacetate) | |
| H$_2$O | 81.6% by weight |

300 m of NO gas was contacted at room temperature with 100 m of an aqueus solution having the above composition absorbing therein 280 m of the NO gas. The liquid containing the absorbed gas was heated at 80° C for 1 hour and thereafter 8 g of K$_2$SO$_4$ was dissolved in the liquid, followed by cooling to room temperature, to obtain 3 g of a precipitate. An infrared spectrum absorption analysis and an elemenaty analysis revealed that the precipitate consisted of NH(SO$_3$K)$_2$ and K$_2$SO$_4$. According to a quantitative analysis by the infrared spectrum absorption method, the NH(SO$_3$K)$_2$ component in the precipitate contained apporoximately 50% of the nitrogen of the absorbed NO gas. After removal of the precipitate, the remaining liquid was mixed with Na$_2$SO$_3$ in a proportion of about 2%, followed by contact with 300 ml of NO gas in the same manner as described hereinbefore to absorb therein 270 ml of the NO gas. The liquid containing the absorbed gas was heated to 80° C and then 4 g of K$_2$SO$_4$ was added, followed by cooling, to obtain a recipitate of approximately 2.6 g of NH(SO$_3$K)$_2$. The precipitate corresponded in nitrogen content to apporoximately 89 % of the NO gas which was absorbed during the second contact absorption.

EXAMPLE 11

| | |
|---|---|
| FeSO₄ | 4% by weight |
| Na₂SO₃ | 4% by weight |
| NTA-Na | 4% by weight |
| (nitrilo sodium triacetate) | |
| H₂O | 88% by weight |

300 ml of NO gas was contacted at 50° C with 100 ml of an aqueous solution having the above composition absorbing therein 275 ml of the NO gas. The liquid containing the absorbed gas was left standing for 4 hours at 50° C and then 10 g of $CH_3COOK$ was dissolved in the liquid, followed by cooking to 10° C, to obtain 2.8 g of a precipitate. The precipitate, after centrifugal separation, was studied by infrared absorption spectrum analysis and found to contain $NH(SO_3K)_2$. By a further quantitative analysis also employing the infrared absorption spectrum method, the 2.8 g of the precipitate was determined to contain 1.7 g of $NH(SO_3K)_2$, which corresponded to 58% of the absorbed NO gas. Presumably, the balance of the absorbed NO gas remained, as shown in Example 10, as dissolved $NH(SO_3K)_2$ in the liquid.

EXAMPLE 12

| | |
|---|---|
| FeSO₄ | 2.0% by weight |
| Na₂SO₃ | 1.0% by weight |
| CH₃COONa | 15.0% by weight |
| CH₃COOH | 0.5% by weight |
| EDTA-Na | 2.0% by weight |
| H₂O | 79.5% by weight |

Nitrogen gas containing 300 ppm of NO and 750 ppm of SO₂ was injected into 200 ml of an aqueous solution having the above composition at a rate of 100 l/h for 10 hours while maintaining the temperature of 50° C. A gas analysis of the exhaust gas released from the aqueous solution revealed that 88% of the NO and 95% of the SO₂ were absorbed in the solution.

Air was injected into the thus obtained absorption solution containing NO and SO₂ to oxidize completely the Na₂SO₃ and FeSO₄ which remained in the solution.

Sulfuric acid was added to the solution to adjust the pH to 2.0, the solution was heated at the temperature of 80° C for 3 hours, and then 0.9 g of 96% pure calcium nitrate was added thereto, to generate 262 ml of nitrogen corresponding to 99% of the absorbed NO gas.

EXAMPLE 13

| | |
|---|---|
| FeSO₄ | 2.0% by weight |
| Na₂SO₃ | 2.0% by weight |
| CH₃COONa | 10.0% by weight |
| CH₃COOH | 2.4% by weight |
| EDTA-Na | 4.0% by weight |
| H₂O | 79.6% by weight |

Nitrogen gas containing 300 ppm of NO was injected into 200 ml of an aqueous solution having the above composition at a rate of 100 l/h for 10 hours while maintaining the temperature at 50° C. A gas analysis of the exhaust gas released from the aqueous solution revealed that 88% of the NO was absorbed in the solution.

Air was injected into the thus obtained absoption solution containing absorbed NO to oxidize completely the Na₂SO₃ and FeSO₄ *which remained in the solution.*

Sulfuric acid was added to the solution to adjust the pH to 2.0, the solution was heated at 80° C for 4 hours, and then 0.9 g of 96% pure calcium nitrite was added thereto, to generate 262 ml of nitrogen corresponding to 99% of the absorbed NO gas.

Slaked lime (Ca(OH)₂) was added in small increments to the liquid which remained after generation of nitrogen to gradually raise the pH value thereof to 6.3, thereby forming calcium sulfate therein. The filtrate obtained after separating the calcium sulfate from the liquid, was used to absorb 1100 ml of SO₂ and then reused as the as the scrubbing solution as described above to 82% of NO.

What is claimed is:

1. A method for removing nitrogen oxides from a gas mixture containing same comprising:
   contacting the gas mixture with an aqueous scrubbing solution containing at least 0.02% by weight of at least one ferrous salt and at least 0.2% by weight of at least one sulfurous acid alkali salt to absorb said nitrogen oxides in said solution in the form of alkali salts of imidodisulfonic acid;
   hydrolyzing said imidodisulfonic acid alkali salts at a pH below 6.5 to obtain a hydrolyzate-containing solution; and
   adding a nitrogen compound selected from the group consisting of nitrous acid, nitrous acid anhydride, and nitrate salts to said hydrolyzate-containing solution so as to react with said hydrolyzate to generate nitrogen.

2. The method of claim 1 wherein said ferrous salt is selected from ferrous sulfate, ferrous nitrate, ferrous chloride, water-soluble ferrous salts of organic acids, and mixtures thereof.

3. The method of claim 2 wherein said organic acid is an ethylenediamine tetracarboxylic acid or a nitrilo-tricarboxylic acid.

4. The method of claim 3 wherein said ethylenediamine tetracarboxylic acid is ethylenediamine tetraacetic acid.

5. The method of claim 3 wherein said nitrilotricarboxylic acid is nitrilo-triacetic acid.

6. The method of claim 1 wherein said aqueous scrubbing solution additionally contains an organic acid, organic acid alkali salt, or a mixture thereof.

7. The method of claim 6 wherein said organic acid is selected from acetic acid, propionic acid, butyric acid, malonic acid, succinic acid and ethylenediamine tetraacetic acid, nitrilotriacetic acid.

8. The method of claim 1 wherein said sulfurous acid alkali salt is selected from sodium sulfite, potassium sulfite, ammonium sulfite, sodium bisulfite, potassium bisulfite, ammonium bisulfite, and mixtures thereof.

9. The method of claim 1 wherein said nitrite is selected from ammonium nitrite, sodium nitrite, potassium nitrite, magnesium nitrite, calcium nitrite, and mixtures thereof.

10. The method of claim 1 wherein said imidodisulfonic acid alkali salt is hydrolyzed at a pH below 5 and at a temperature within the range of from 40° to 100° C.

11. The method of claim 1 wherein the liquid remaining after release of the nitrogen is recirculated for use as said aqueous scrubbing solution.

* * * * *

Disclaimer

3,992,508.—*Shigeru Saitoh, Tetsuya Watanabe, Koji Konno,* and *Tadashi Nakamura,* Iwaki, Japan. METHOD OF REMOVING NITROGEN OXIDES FROM A GAS CONTAINING NITROGEN OXIDES. Patent dated Nov. 16, 1976. Disclaimer filed May 31, 1977, by the assignee, *Kureha Kagaku Kogyo Kabushiki Kaisha.*

The term of this patent subsequent to Nov. 9, 1993, has been disclaimed.

[*Official Gazette September 6, 1977.*]